US006471923B1

United States Patent
Becue et al.

(10) Patent No.: US 6,471,923 B1
(45) Date of Patent: Oct. 29, 2002

(54) PROCESS FOR ADSORBING AND DESORBING OXIDES OF NITROGEN

(75) Inventors: Thierry Becue, Paris (FR); Gil Mabilon, Carrieres sur Seine (FR); Philippe Villeret, Rueil-Malmaison (FR)

(73) Assignee: Institut Francais du Petrole (FR)

( * ) Notice: Subject to any disclaimer, the term of this patent is extended or adjusted under 35 U.S.C. 154(b) by 99 days.

(21) Appl. No.: 09/631,990

(22) Filed: Aug. 3, 2000

(30) Foreign Application Priority Data

Aug. 4, 1999 (FR) .............................. 99 10174

(51) Int. Cl.[7] .............................. C01G 30/00; B01J 8/00; B01J 27/199; B01J 20/02; B01J 27/185
(52) U.S. Cl. ................................ 423/213.2; 423/213.5; 423/239.1; 502/208; 502/209; 502/210; 502/211; 502/213; 502/425
(58) Field of Search ................................ 423/213.2, 213.5, 423/239.1; 502/208, 209, 210, 211, 213, 425

(56) References Cited

U.S. PATENT DOCUMENTS

| 4,180,551 A | * | 12/1979 | Clearfield | ...................... 423/249 |
| 5,200,378 A | * | 4/1993 | Clearfield | ...................... 502/62 |
| 5,234,884 A | * | 8/1993 | Mouri et al. | ................. 502/405 |

FOREIGN PATENT DOCUMENTS

| JP | 0202710 | * | 11/1986 | ........... C01B/25/37 |
| JP | 08281116 | * | 10/1996 | .......... B01J/27/185 |
| JP | 10174867 | * | 7/1998 | ............ B01J/23/58 |

OTHER PUBLICATIONS

Patent Abstracts of Japan, vol. 018, No. 542, Jul. 12, 1994, JP6191810.*
Xiao J, et al. "Selective Oxidation on Chromia–Pillared Zirconium Phosphate and Phehylphosphate", Feb. 1999.*

* cited by examiner

Primary Examiner—Wayne A. Langel
Assistant Examiner—Jonas N. Strickland
(74) Attorney, Agent, or Firm—Millen, White, Zelano & Branigan, P.C.

(57) ABSTRACT

The invention concerns materials for adsorbing and desorbing oxides of nitrogen NO and $NO_2$ present in exhaust gases, in particular from the internal combustion engines of automotive vehicles operating in a medium which is super-stoichiometric in oxidizing agents, which can desorb the oxides of nitrogen by elevating the temperature, with respect to an adsorption temperature, the structure of the materials being composed of phosphate tetrahedra and containing at least one element (A) from groups IVB, VB, VIB, VIIB, IVA, optionally at least one element (B) selected from the group formed by alkali elements IA, alkaline-earth elements IIA, rare earths IIIB and transition metals, and optionally at least one metal (C) selected from the group formed by the precious metals of the platinum family (group VIII).

These materials are insensitive to the oxides of sulphur and carbon contained in the gas.

18 Claims, No Drawings

PROCESS FOR ADSORBING AND DESORBING OXIDES OF NITROGEN

TECHNICAL FIELD

The present invention relates to materials which encourage elimination by adsorption of oxides of nitrogen (NO and $NO_2$, usually termed $NO_x$) present in a gas mixture which may be super-stoichiometric in oxidising compounds, and in particular in oxygen, said materials not being poisoned by the sulphur-containing products encountered in those gases. The invention is applicable to eliminating oxides of nitrogen ($NO_x$) present in the exhaust gases from automotive vehicles, in particular from vehicles functioning with diesel fuel.

PRIOR ART

The high toxicity of oxides of nitrogen and their role in the formation of acid rain and tropospheric ozone have led to the instigation of strict regulations limiting the discharge of such compounds. In order to satisfy those regulations, it is generally necessary to eliminate at least a portion of such oxides present in exhaust gases from automotive or stationary engines and from turbines.

The elimination of oxides of nitrogen by thermal decomposition or preferably by catalytic if decomposition can be envisaged, but the high temperatures demanded by this reaction are incompatible with those of the exhaust gases. Only catalytic reduction of oxides of nitrogen to nitrogen is possible using the reducing agents which are present, albeit in small quantities, in the exhaust gases (CO, $H_2$, unburned hydrocarbons or where combustion in the engine has been imperfect), and also by injecting a complement to those reducing compounds upstream of the catalyst. Such reducing agents are hydrocarbons, alcohols, ethers or other oxygen-containing compounds, they can also be a liquid or gaseous fuel (under pressure, CNG, or liquefied, LPG) feeding the engine or turbine.

European patent EP-A-0 540 280 describes an apparatus for reducing emissions of oxides of nitrogen in the exhaust gases from internal combustion engines, which comprises a material for adsorbing and desorbing oxides of nitrogen. In that process, the oxides of nitrogen are stored in the form of nitrates when the engine is burning lean, i.e., depleted in hydrocarbons. However the storage capacity of a trap operating using that principle is generally deteriorated by adsorption of sulphur-containing products contained in the exhaust gas which form sulphates which are more stable that the nitrates, poisoning the trap.

Further, following $NO_x$ trapping, a step for desorbing the oxides of nitrogen must be carried out followed by their reduction. Devices for treatment by catalysed oxidation of carbon monoxide CO and hydrocarbons HC contained in the exhaust gases are known which, for example, use catalysts for reducing oxides of nitrogen, known as $NO_x$ catalysts, which are active for reducing $NO_x$ in temperature ranges in the range 200° C. to 350° C. and which comprise, for example, precious metals on oxide supports such as platinum or palladium deposited on an alumina, titanium oxide or zirconium support, or by perovskites, or in temperature ranges in the range 350° C. to 600° C. comprising, for example, hydrothermally stable zeolites (for example Cu-ZSM5). A device for treating exhaust gases from a compression ignition engine comprising a catalyst and an oxides of nitrogen adsorbent placed in the exhaust collector has been described, for example, in patents EP-A1-0 540 280 and EP-A1-0 718 478.

Thus a material behaving as a trap for oxides of nitrogen has to be capable of adsorbing the oxides of nitrogen at low temperatures up to the temperature necessary for the $NO_x$ reduction catalyst to function, the trap then allowing the oxides of nitrogen coming into contact with the $DeNO_x$ catalyst to desorb at a temperature sufficient to trigger the $NO_x$ reduction reaction.

Oxides with a crystallographic structure which generate channels with a size sufficient to accommodate oxides on nitrogen have been described (Japanese patent JP09075715A). The solids used in that Japanese patent are oxides containing Al and Sn or Zn and Sn mixtures, and have the crystallographic structure of hollandite.

French patent FR-A-2 733 924 describes a material with formula $YBa_2Cu_3O_{7-x}$ which can integrate the oxides of nitrogen in the mixed oxide composing the material. That patent indicates that the material, after being charged with oxides of nitrogen, is transformed by passing from an orthorhombic structure which is rich in oxygen to a tetragonal structure which is depleted in oxygen when the oxygen content of the gas reduces, and that phase transition causes desorption of oxides of nitrogen. According to that process, it is possible to influence adsorption and desorption of the oxides of nitrogen by varying the amounts of oxygen in the exhaust gases. It has recently been demonstrated (K-Y Lee, K. Watanabe, M. Misono, Applied Catalysis B 13, 241 (1997)) that the adsorption of NO in the presence of oxygen on the material $YBa_2Cu_3O_{7-x}$ leads to the formation of barium nitrate species ($Ba(NO_3)_2$). That same study also showed that that material suffers a dramatic loss of its oxides of nitrogen adsorption properties in the presence of carbon dioxide by forming barium carbonates. Since barium sulphate species are more stable than the nitrate species, it is feared that a compound of the $YBa_2Cu_3O_{7-x}$ type is also poisoned in the presence of sulphur dioxide by forming sulphate species on the oxides of nitrogen adsorption sites.

A. Clearfield and J. Stynes, J. Inorg. Nucl. Chem., 26 (1964), 117 and G. Alberti and E. Torracca, J. Inorg. Nucl. Chem., 30 (1968), 317 describe materials with a structure composed of phosphate tetrahedra and containing an element with an oxidation number of +4.

SUMMARY OF THE INVENTION

The invention concerns materials for adsorbing and desorbing oxides of nitrogen NO and $NO_2$, in particular those present in exhaust gases, for example from the internal combustion engines of automotive vehicles functioning in a medium which is super-stoichiometric in oxidising agents, said materials being able to desorb $NO_x$ by raising the temperature. The materials are lamellar in structure and comprise phosphate tetrahedra and at least one element A selected from elements from groups IVB, VB, VIB, VIIB and IVA of the periodic table.

SIGNIFICANCE OF THE INVENTION

The adsorption and desorption material of the invention can trap oxides of nitrogen at low temperatures and desorb them at the temperature at which a deNOx catalyst is capable of reducing them. These materials are insensitive to the oxides of sulphur and carbon contained in the exhaust gases, which prevents the materials from being poisoned. The materials adsorb oxides of nitrogen over a wide temperature range while desorption is carried out in a very narrow temperature range which means that thermal regeneration is easy to control. During desorption, the oxides of nitrogen which have been adsorbed are released in bursts with a high $NO_x$ concentration, which is beneficial to the reaction kinetics for reduction of the desorbed oxides of nitrogen. The kinetics of the reduction of $NO_x$ by hydrocarbons are positive with respect to the oxides of nitrogen species. Said material does not have a basic oxide phase which substantially stabilises the oxides of nitrogen and oxides of sulphur into the nitrate and sulphate forms respectively. The $SO_x$ which can be inserted with the $NO_x$ into the structure of the material of the invention are desorbed in a temperature range which is similar to that of the $NO_x$. Preventing the formation of stable sulphates ensures that poisoning of the adsorbing, material is minimal, meaning that the regeneration frequency and the regeneration temperature are lower, and thus the service life of the $NO_x$ trap is longer.

DESCRIPTION OF THE INVENTION

The present invention concerns materials for adsorbing and desorbing oxides of nitrogen, the structure of which is composed of phosphate tetrahedra containing at least one element (A) selected from elements from groups IVB, VB, VIB, VIIB and IVA of the periodic table. Preferably, this element (A) has an oxidation number of +4. The phosphate has a lamellar structure into which the $NO_x$ can insert at low temperatures and from which it can leave at high temperatures.

The adsorbing phase of the invention has a lamellar structure, it is composed of phosphate tetrahedra and it comprises:

at least one element (A) selected from the group formed by elements from groups IVB, VB, VIB, VIIB and IVA of the periodic table, optionally, at least one element (B) selected from the group formed by alkali elements IA, alkaline-earth elements IIA, rare earth elements IIIB or transition metals from the periodic table, optionally, at least one metal (C) selected from the group formed by precious metals from the platinum family (group VIII).

Preferably, the material of the invention contains at least one element (B) and preferably at least one element (C).

Elements (A) from groups IVB, VB, VIB, VIIB and IVA preferably have an oxidation number of +4 and are integrated into the octahedral sites arranged in the phosphate framework constituting the lamellae. Elements (A) are preferably selected from zirconium, titanium, germanium, or tin or a mixture of at least two of these elements. Preferably, zirconium or titanium are selected.

Elements (B) are selected from the group formed by the alkali elements IA, alkaline-earth elements IIA, rare earth elements IIIB or transition metals. They are located in the space between the lamellae of the lamellar material and at least partially compensate for the negative charge generated by the phosphate framework. An alkali metal is preferred, such as potassium or caesium.

Elements (C) are selected from the group formed by platinum, palladium, rhodium, ruthenium, iridium and osmium, preferably platinum. This implementation of the invention comprising at least one element (C) selected from noble metals from group VIII can oxidise NO to $NO_2$. The structure of the materials used in the process of the invention is more effective for inserting the nitrogen dioxide ($NO_2$) molecule than for inserting the nitric oxide (NO) molecule. Thus the presence of an element (C) can have a beneficial effect on the adsorption capacity of molecules of oxides of nitrogen contained in the exhaust gases.

The adsorbing phase of the invention has the following composition by weight, expressed as the percentage by weight with respect to the total mass of this active phase calcined at 1000° C. for 4 h:

20% to 80% of phosphate, preferably 30% to 70% by weight, more preferably 30% to 60%, expressed as $PO_4$;

5% to 40%, preferably 10% to 30%, of at least one element (A) selected from groups IVB, VB, VIB, VIIB, IVA of the periodic table;

optionally 1% to 55%, preferably 10% to 55%, of at least one element (B) selected from the group formed by alkali elements, alkaline-earth elements, rare earth elements or transition metals from the periodic table, optionally, 0.05% to 5% of at least one metal (C) selected from the group formed by the precious metals from the platinum family.

The adsorbent phases can be in the form of a powder, beads, pellets or extrudates; they can also be deposited or directly prepared on monolithic supports of ceramic or metal. Advantageously, in order to increase the specific surface area of the materials and thus to increase their capacity to adsorb $NO_x$, the materials can be deposited on large specific surface area porous supports such as silica or alumina ($SiO_2$, $Al_2O_3$, $TiO_2$, $ZrO_2$, SiC, MgO . . . ) before being formed (extrusion, coating . . . ).

The process for preparing the material of the invention comprises the following steps:

(a) mixing an aqueous solution of a salt of element (A) with a concentrated phosphoric acid in the presence of a strong acid, or fluorocomplexes of element (A) are slowly decomposed in the presence of concentrated phosphoric acid and a strong acid, then heated under reflux to crystallise the complex, (b) it is washed and dried to obtain an acidic compound which is lamellar;

(c) optionally, element (B) is introduced by dissolving the compound from step b) in a solution of a salt of element (B), to at least partially exchange the protons of the synthesised material with cations of at least one element (B) and then introduce element (B) in the cationic state into the lamellar structure of the compound, (d) it is dried and calcined at at least 400° C., element (B) remaining in the cationic state, (e) optionally, at least one metal (C) is added using one of the following steps:

impregnating the compound from step d) with a solution of a precursor salt of at least one element followed by calcining or prior to exchange with a cation of an element (B), proton exchange of the compound of step b), with a cation of at least one element (C), followed by calcining to form small aggregates of precious metal at the surface of the compound and to regenerate protons, the compound can then undergo a fresh cation exchange of protons by a cation of at least one element (B), by intimate and mechanical mixing of the compound of step b) or d) with a powder composed of a support on which at least one element (C) is deposited, f) optionally, pillars are formed in the lamellar structure using one of the following steps:

directly inserting one or more metallic complexes of elements from groups 13, 14 (IIIA, IVA) or transition metals into the lamellae by prolonged heating in an acid medium, or intercalating polar organic molecules (alkylamines, alcohols, amino acids) which are then exchanged with the metal complex or complexes;

calcining the inserted metallic species to form thermally stable oxide phases. The pillars formed are either clusters of the oxide of the metal or metals introduced, or aggregates composed of solid solutions of oxides of the metals introduced, g) optionally, the compound is deposited or the compound is synthesised directly on a support with a large specific surface area, generally an inorganic refractory oxide.

The process for preparing materials used in the process of the present invention preferably comprises step f) and preferably comprises step g).

Step a) is carried out in an acidic medium at a pH below 5.

Step f) is carried out to increase the specific surface area of the material which is then in the range 30 to 500 $m^2/g$, preferably in the range 100 to 500 $m^2/g$, more preferably in the range 150 to 300 $m^2/g$. Preferably, step f) is carried out after step b) and before step c). The weight of oxide pillars can represent up to 80% of the total dry weight of the adsorbing material.

The refractory inorganic oxide of step g) is generally selected from the group formed by the following compounds: alumina (alpha, beta, delta, gamma, khi, or theta alumina), silicas, silica-aluminas, zeolites, titanium oxide, zirconium oxide, divided carbides, for example silicon carbides, used alone or as a mixture. Mixed oxides or solid solutions comprising at least two of the above oxides can be added.

However, for use in a vehicle, it is usually preferable to use rigid supports (monoliths) with a large open porosity (more than 70%) to limit pressure drops which may cause high gas flow rates. and in particular high exhaust gas space velocities. These pressure drops are deleterious to proper functioning of the engine and contribute to reducing the efficiency of an internal combustion engine (gasoline or diesel). Further, the exhaust system is subjected to vibrations and to substantial mechanical and thermal shocks, so catalysts in the form of beads, pellets or extrudates run the risk of deterioration due to wear or fracturing.

Two techniques are used to prepare the catalysts of the invention on monolithic ceramic or metal supports (or substrates).

The first technique comprises direct deposition on the monolithic support, using a wash coating technique which is known to the skilled person, to coat the adsorbing phase prepared using the operating procedure described above (steps a), b), d), optionally c), e), f) and g)). The adsorbent phase can also be coated after the end of step c) and calcining step d) can be carried out on the phase deposited on the monolith.

The second technique comprises firstly depositing the inorganic oxide on the monolithic support then calcining the monolith between 500° C. and 100° C. so that the specific surface area of this oxide is in the range 20 to 150 $m^2/g$, then coating the monolithic substrate covered with the inorganic oxide with the adsorbent phase obtained after steps b), c), d), e) or f) described above. Steps d) and e) can be carried out directly on the monolith after coating the gel obtained at c) on the monolithic substrate covered with refractory oxide. Preferably, step f) is carried out before the coating stage.

The monolithic supports which can be used are:

either ceramic, where the principal elements can be alumina, zirconia, cordierite, mullite, silica, aluminosilicates or a combination of several of these compounds, or a silicon carbide and/or nitride;

or aluminium titanate;

or of metal, generally obtained from iron, chromium or aluminium alloys optionally doped with nickel, cobalt, cerium or yttrium. The most common are those known as FECRALLOY® or KANTHAL®.

The structure of the ceramic supports is that of a honeycomb or they are in the form of a foam or fibres.

Metal supports can be produced by winding corrugated strips or by stacking corrugated sheets to constitute a honeycomb structure with straight or zigzag channels which may or may not communicate with each other. They can also be produced from metal fibres or wires which are interlocked, woven or braided.

With supports of metal comprising aluminium in their composition, it is recommended that they are pre-treated at high temperature (for example between 700° C. and 110° C.) to develop a micro-layer of refractory alumina on the surface. This superficial micro-layer, with a porosity and specific surface area which is higher than that of the original metal, encourages adhesion of the active phase and protects the remainder of the support against corrosion.

The quantity of adsorbing phase deposited or prepared directly on the ceramic or metallic support (or substrate) is generally in the range 20 to 300 g per liter of said support, advantageously in the range 50 to 200 g per liter.

The materials of the invention can thus adsorb and desorb oxides of nitrogen present in the gases, in particular exhaust gases.

These materials are characterized in that they are capable of adsorbing $NO_x$ at a temperature which is generally in the range 50° C. to 400° C., preferably in the range 100° C. to 350° C., more preferably in the range 150° C. to 250° C., said oxides of nitrogen being capable of being desorbed at a temperature generally in the range 300° C. to 500° C., preferably in the range 350° C. to 450° C. Thus the desorption of the invention can respectively take place within narrow ranges of temperature generally within a range of 80° C. For light diesel cars, the temperature of the exhaust gas is generally in the range 150° C. to 300° C. and rarely exceeds 500° C. The materials used in the process of the invention are thus suitable for adsorbing oxides of nitrogen present in the exhaust gases of stationary engines or, particularly, automotive diesel engines or spark ignition (lean burn) engines, but also in the gases from gas turbines operating with gas or liquid fuels. These gases are also characterized by oxides of nitrogen contents of a few tens to a few thousands of parts per million (ppm) and can contain comparable amounts of reducing compounds (CO, $H_2$, hydrocarbons) and sulphur, also large quantities of oxygen (1 to close to 20% by volume) and steam. The material of the invention can be used with HSVs (volume of material per volume of gas per hour) of the exhaust gas generally in the range 500 to 150000 $h^{-1}$, for example in the range 5000 to 100000 $h^{-1}$.

The invention also concerns the use of materials for adsorbing and desorbing oxides of nitrogen in a process for eliminating oxides of nitrogen, more particularly in a medium which is super-stoichiometric in oxidising agents. Thus the material of the invention can be used in a process comprising:

an optional step for oxidising at least a portion of the oxides of nitrogen in the presence of an oxidation material, a step for adsorbing at least a portion of said oxides of nitrogen onto an adsorption material as defined in the present invention, a step for desorbing the oxides of nitrogen, a step for selective reduction of at least a portion of the oxides of nitrogen to molecular nitrogen by reducing agents in the presence of at least one catalyst for reducing oxides of nitrogen.

Thus the process for eliminating oxides of nitrogen comprises, during the step for reducing the oxides of nitrogen, using a catalyst which is active and selective using reducing agents to reduce oxides of nitrogen to molecular nitrogen in a medium which is super-stoichiometric in oxidising agents. Catalysts for reducing oxides of nitrogen to nitrogen or nitrous oxide generally comprise at least one inorganic refractory oxide and can comprise at least one zeolite selected, for example, from MF1, NU-86, NU-87 and EU-1 zeolites and generally at least one element selected from elements from groups VIB, VIIB, VIII and IB, and transition metals. These catalysts can optionally contain at least one element selected from noble metals from group VIII, for example platinum, rhodium, ruthenium, iridium, palladium and optionally at least one element selected from elements from groups IIA the alkaline-earths and IIIB, the rare earths. Examples of catalysts for reducing oxides of nitrogen include the following combinations Cu-ZSM5, Fe-ZSM5, Ce-ZSM5, Pt-ZSM5.

The refractory inorganic oxide is selected from supports of the type $Al_2O_3$, $SiO_2$, $ZrO_2$ and $TiO_2$, preferably alumina.

The reducing agents are selected from CO, $H_2$, hydrocarbons, present in the fuel or added in the form of fresh products.

In the case where the material for adsorbing oxides of nitrogen of the present invention contains at least one element (C) selected from noble metals from groups 8, 9 and 10 of the periodic table, the process for eliminating oxides of nitrogen comprises a first step for oxidising and reducing oxides of nitrogen to nitrogen or nitrous oxide can take place directly on the adsorption material of the invention which permits both oxidation of oxides of nitrogen, trapping of the oxides of nitrogen, desorption of said oxides of nitrogen and reduction thereof.

EXAMPLES

Examples 1 and 5 to 12 below illustrate the invention without in any way limiting its scope.

Examples 2 to 4 describe prior art materials used to trap $NO_x$.

For comparison purposes, all of these catalysts were tested in the laboratory in a micro-unit with a synthetic gas mixture.

In all of the examples, the designation of the adsorbent phase deposited on the support (or substrate) corresponded to the sum of the elements constituting the material described in the above procedure after the loss on ignition, namely: phosphate tetrahedra, at least one element (A), at least one optional element (B), at least one optional precious metal (C) or the elements constituting the oxide pillars.

The weight contents of the different elements constituting the adsorbent phase are shown in Table 1 as a percentage. The oxygen in the oxide phases is not taken into account in the material balance, except for the phosphates.

Example 1

Invention 0.15 moles of $ZrOCl_2.8H_2O$ was dissolved in 1 liter of HCl (3 mol/l). 1 liter of HCl (1.7 mol/l)+$H_3PO_4$ (1.7 mol/l) was then added. The solution obtained was stirred and heated under reflux for 12 hours then filtered. The product recovered was then taken up into solution in 2 liters of $H_3PO_4$ (2.5 mol/l) and heated under reflux for 12 hours.

After centrifuging, the product recovered was washed with distilled water to remove the excess phosphoric acid then it was allowed to dry in air.

Proton exchange of the solid obtained with caesium cations was carried out in two steps. Firstly, partial exchange of these protons was carried out with sodium cations. To this end, the solid obtained was introduced into a solution of sodium dihydrogen phosphate ($NaH_2PO_4.2H_2O$) in a concentration of 0.5 M, then it was filtered. The product was then washed with distilled water and dried.

The compound could then undergo exchange with caesium. This exchange was carried out by introducing the powder obtained into a solution of caesium acetate in a concentration of 0.4 M. The suspension was stirred at ambient temperature for 12 hours then filtered, rinsed and dried in air.

The exchanged and dried material was dehydrated at 180° C. for 12 hours. Before use, it would be calcined in air, at 600° C.

Example 2

Comparative

A material for occluding $NO_x$ was prepared using the technique described in JP 9075714, with the following formulation: $K_{1.8}Zn_{0.9}Sn_{6.2}O_{1.6}$ and which had a hollandite structure (verified by X ray diffraction).

Example 3

Comparative

A material for occluding $NO_x$ with formula $YBa_2Cu_3O_{7-x}$ was prepared using the technique described in EP-A-0 664 147, which had a perovskite structure (verified by X ray diffraction).

Example 4

Comparative

The material with formula $PrBaLa$—$CeO_2$—$Al_2O_3$—$TiO_2$ as described in European patent application EP-A-0 666 103 was used to trap $NO_x$ by nitrate formation.

Example 5

Invention

The catalyst of Example 1 was reproduced, with the exception that the step for exchange with caesium was replaced with an exchange with potassium with a solution of potassium acetate at a concentration of 0.4 M.

Example 6

Invention

The catalyst of Example 1 was reproduced, with the exception that the step for exchange with caesium at ambient temperature was replaced by an exchange with barium using a solution of barium acetate in a concentration of 0.2 M.

Example 7

Invention 0.15 moles of $ZrOCl_2.8H_2O$ was dissolved in 150 ml of $H_2O$.

415 g of $NaH_2PO_4$ was dissolved in 300 ml of a hydrochloric acid solution (3 M). The zirconium salt was introduced dropwise into the hot sodium orthophospate solution. The gel obtained was stirred and heated under reflux for 25 hours. The gel was then filtered and washed with a 0.2 M solution of $NaH_2PO_4$, then it underwent a final rinse to remove the excess phosphate. It was then dried in air.

The compound could then undergo exchange with caesium. This exchange was carried out by introducing the powder obtained into a solution of caesium acetate in a concentration of 0.4 M. The suspension was stirred at ambient temperature for 12 hours then filtered, rinsed and dried in air.

The exchanged and dried material was dehydrated at 180° C. for 12 hours. Before use, it would be calcined in air at 600° C.

Example 8

Invention

The catalyst of Example 7 was reproduced with the exception that the exchange step carried out with caesium at ambient temperature was replaced by an exchange with barium using a solution of barium acetate in a concentration of 0.2 M.

Example 9

Invention 0.15 moles of $ZrOCl_2.8H_2O$ was dissolved in 1 liter of HCl (3 mol/l). 1 liter of HCl (1.7 mol/l)+$H_3PO_4$ (1.7 mol/l) was then added. The solution obtained was stirred and heated under reflux for 12 hours then filtered. The product recovered was then washed with distilled water. The compound then underwent exchange with caesium. This exchange was carried out by introducing the powder obtained into a solution of caesium acetate in a concentration of 0.4 M. The suspension was stirred at ambient temperature for 12 hours, then filtered, rinsed and dried in air.

The exchanged and dried materials were dehydrated by heating them to 180° C. for 12 hours. Before use, they would be calcined in air at 600° C.

Example 10

Invention 0.15 moles of $ZrOCl_2.8H_2O$ was dissolved in 1 liter of HCl (3 mol/l). 1 liter of HCl (1.7 mol/l)+$H_3PO$, (1.7 mol/l) was then added. The solution obtained was stirred and heated under reflux for 12 flours then filtered. The product recovered was then taken up into solution in 2 liters of $H_3PO_4$ (4.5 mol/l) and heated under reflux for 5 days. The excess phosphoric acid was removed by centrifuging and the material obtained was washed with distilled water then dried in air A solution of n-propylamine (0.1 M) was added dropwise to the product obtained in a proportion of 100 ml per gram of product. The suspension obtained was mixed for 4 hours, then filtered and washed.

The material was taken up into solution in a volume of water and a solution of basic aluminium chloride with a pH of 4 was added. The mixture was heated under reflux for 24 hours.

The filtered, washed and dried product was then calcined in air at 450° C. for 5 hours.

The compound then underwent exchange with caesium. This exchange was carried out by introducing the powder obtained into a solution of caesium acetate in a concentration of 0.4 M. The suspension was stirred at ambient temperature for 12 hours, then filtered, rinsed and dried in air.

The exchanged and dried material was dehydrated at 180° C. for 12 hours. Before use, it would be calcined in air at 600° C.

Example 11

Invention 0.15 moles of $ZrOCl_2.8H_2O$ was dissolved in 1 liter of HCl (3 mol/l). 1 liter of HCl (1.7 mol/l)+$H_3PO_4$ (1.7 mol/l) was then added. The solution obtained was stirred and heated under reflux for 12 hours then filtered. The product recovered was then taken up into solution in 2 liters of $H_3PO_4$ (4.5 mol/l) and heated under reflux for 5 days. The excess phosphoric acid was removed by centrifuging and the material obtained was washed with distilled water then dried in air.

The material obtained was introduced into 3 liters of an aqueous solution containing 10% by weight of $NH_2(CH_2)_3Si(OC_2H_5)_3$; the solution obtained was heated under reflux for 72 hours, then the suspension was filtered, washed and dried. The powder obtained was dehydrated at 180° C. for 12 hours, then calcined in air at 450° C. for 5 hours.

The compound then underwent exchange with caesium. This exchange was accomplished by introducing the powder obtained into a solution of caesium acetate in a concentration of 0.4 M. The suspension was then stirred at ambient temperature for 12 hours, then filtered, rinsed and dried in air.

The exchanged and dried material was dehydrated at 180° C. for 12 hours. Before use, it would be calcined in air at 600° C.

Example 12

Invention 50 grams of a solution of $TiCl_4$ was mixed with 1 liter of HCl (2 mol/l) and 1 liter of $H_3PO_4$ (2 mol/l). This was heated under reflux for 12 hours, then filtered. The product recovered was then washed with a solution of $H_3PO_4$.

The product was then heated under reflux in a solution of $H_3PO_4$ (3 mol/l) for 12 hours. The product was then filtered and introduced into a solution of sodium dihydrogen phosphate ($NaH_2PO_4.2H_2O$) in a concentration of 0.5 M, then it was filtered. The product was then washed with distilled water and dried.

The compound could then undergo exchange with caesium. This exchange was carried out by introducing the powder obtained in a solution of caesium acetate in a concentration of 0.4 M. The suspension was stirred at ambient temperature for 12 hours then filtered, rinsed and dried in air.

The exchanged and dried material was dehydrated at 180° C. for 12 hours. Before use, it would be calcined in air at 600° C.

TABLE I

Composition by weight of materials prepared in Examples 1 to 12

| Examples | Materials | K | Cs | Ba | La | Ce | Y | Cu | Zn | Zr | Sn | Ti | Al | Si | PO$_4$ | Pt |
|---|---|---|---|---|---|---|---|---|---|---|---|---|---|---|---|---|
| Example 1 (inv) | Cs—ZrP | | 29.3 | | | | | | | 17.6 | | | | | 53.1 | |
| Example 2 (comp) | Hollandite K—Sn—Zn | 11.2 | | | | | | | 9.4 | | 58.9 | | | | | |
| Example 3 (comp) | YBaCuO | | | 41.7 | | | 13.5 | 29.0 | | | | | | | | |
| Example 4 (comp) | PtBaLa—CeO$_2$—Al$_2$O$_3$—TiO$_2$ | | | 18 | 3 | 11 | | | | | | 8.5 | 18.1 | | | 0.5 |
| Example 5 (inv) | K—ZrP | 13.6 | | | | | | | | 21.2 | | | | | 65.2 | |
| Example 6 (inv) | Ba—ZrP | | | 32.6 | | | | | | 18.9 | | | | | 48.5 | |
| Example 7 (inv) | Cs—ZrP | | 24.7 | | | | | | | 17.4 | | | | | 57.9 | |
| Example 8 (inv) | Ba—ZrP | | | 31.8 | | | | | | 18.5 | | | | | 49.7 | |
| Example 9 (inv) | Cs—ZrP | | 28.6 | | | | | | | 19.8 | | | | | 51.6 | |
| Example 10 (inv) | Cs—ZrP Al$_2$O$_3$ bridged | | 25.8 | | | | | | | 16.1 | | | 14.3 | | 33.5 | |
| Example 11 (inv) | Cs—ZrP SiO$_2$ bridged | | 21.1 | | | | | | | 14.5 | | | | 16.0 | 30.1 | |
| Example 12 (inv) | Cs—TiP | | 40.1 | | | | | | | | | 12.1 | | | 47.8 | |

Example 13

Results of Adsorption-desorption Tests

The test materials were installed in a micro-reactor placed in the centre of a furnace. They underwent pre-treatment at 600° C. for 5 hours in a gas mixture constituted by nitrogen containing 10% of $O_2$ and 2% of $H_2O$. With the same mixture, these materials were brought to a temperature of 200° C. when a gaseous mixture containing oxides of nitrogen was passed for 20 minutes.

| | |
|---|---|
| Hourly space velocity (HSV) | 5000 h$^{-1}$ |
| Composition of mixture | |
| NO$x$ | 800 ppm |
| O$_2$ | 10% |
| H$_2$O | 2% |
| N$_2$ | complement to 100% |

After twenty minutes of adsorption, the supply of oxides of nitrogen was cut off and the materials were heated to desorb the NO$_x$:

| | |
|---|---|
| Hourly space velocity (HSV) | 5000 h$^{-1}$ |
| Composition of mixture | |
| O$_2$ | 10% |
| H$_2$O | 2% |
| N$_2$ | complement to 100% |
| Desorption temperature range | 200° C. to 600° C. |
| Temperature change | 10° C./min |

Table II below shows the values indicating the quantity of oxides of nitrogen adsorbed and the desorption temperature of these oxides. With the exception of the material of Example 4 which already contained platinum in its composition, the results shown in the columns marked "with platinum" are those of materials to which a Pt/SiO$_2$ phase had been added, equivalent to a weight percentage of 1% with respect to the total mass of the mixture. It was verified that, under our conditions, this Pt/SiO$_2$ phase did not act as an adsorbing mass for oxides of nitrogen.

TABLE II

Results of micro-unit adsorption-desorption tests

| | | | No Pt | | With Pt | |
|---|---|---|---|---|---|---|
| Example | Materials | Specific surface area (m$^2$/g) | Capacity at 200° C. (mgNO/g) | T$_{des}$ (° C.) | Capacity at 200° C. (mgNO/g) | T$_{des}$ (° C.) |
| 1 (inv) | Cs—ZrP | 12 | 0.4 | 420 | 1.5 | 360 |
| 2 (comp) | Hollandite K—Sn—Zn | 4 | 0.09 | 425 | | |
| 3 (comp) | YBaCuO | 3.5 | 1.1 | 490 | | |
| 4 (comp) | PtBaLa—Ce—Al$_2$O$_3$—TiO$_2$ | 120 | | | 6.1 | 570 |
| 5 (inv) | K—ZrP | 16 | 0.4 | 405 | 1.1 | 300 |
| 6 (inv) | Ba—ZrP | 12 | 0.15 | 390 | 0.4 | 220 |
| 7 (inv) | Cs—ZrP | 25 | 0.4 | 390 | 2.2 | 300 |
| 8 (inv) | Ba—ZrP | 25 | 0.13 | 345 | 0.4 | 250 |
| 9 (inv) | Cs—ZrP | 6 | 0.3 | 405 | 0.7 | 300 |
| 10 (inv) | Cs—ZrP Al$_2$O$_3$ bridged | 125 | 3.1 | 415 | 12.7 | 350 |
| 11 (inv) | Cs—ZrP SiO$_2$ bridged | 225 | 4.3 | 395 | 18.3 | 320 |
| 12 (inv) | Cs—TiP | 8 | 0.3 | 410 | 1.2 | 365 |

It can be seen that the phosphates claimed by the Applicant, particularly when these contain alkali elements, are effective in adsorbing oxides of nitrogen. The adsorption capacity can advantageously be improved by increasing the specific surface area by introducing oxide pillars into the lamellar structure of the claimed materials. The presence of an oxidising phase is also beneficial and can increase the quantity of NO$_x$ trapped in the claimed materials.

Example 14

Extrapolation to Large Hourly Space Velocity and Complex Gas Mixture

The test materials were installed in a reactor placed in the centre of a furnace. They underwent pre-treatment at 600° C. for 5 hours in a gas mixture constituted by nitrogen containing 18.5% $O_2$, 5% $CO_2$, 4% $H_2O$ and 500 ppm of C in $C_2H_4$. In the same mixture, these material brought to a temperature of 200° C., where a gas mixture containing oxides of nitrogen was passed for 20 minutes.

| Hourly space velocity (HSV) | 50000 $h^{-1}$ |
| --- | --- |
| Composition of mixture | |
| NOx | 800 ppm |
| $O_2$ | 18.5% |
| $H_2O$ | 4% |
| $CO_2$ | 5% |
| $C_2H_4$ | 500 ppm C |
| $N_2$ | complement to 100% |

After twenty minutes of adsorption, the supply of oxides of nitrogen was cut off and the materials were heated to desorb the $NO_x$:

| Hourly space velocity (HSV) | 50000 $h^{-1}$ |
| --- | --- |
| Composition of mixture | |
| $O_2$ | 18.5% |
| $H_2O$ | 4% |
| $CO_2$ | 5% |
| $C_2H_4$ | 500 ppm C |
| $N_2$ | complement to 100% |
| Desorption temperature range | 200° C. to 600° C. |
| Temperature change | 10° C./min |

Table III below indicates the quantity of oxides of nitrogen adsorbed and the desorption temperature of these oxides for the material of Example 1, they are compared with the results obtained under the preceding conditions for the same material.

It can be seen that the phosphates claimed by the Applicant have a comparable efficiency for adsorption of oxides of nitrogen whether the HSV is 5000 or 50000 $h^{-1}$. Further, if the mixture is rendered more complex by adding other gaseous molecules ($CO_2$, $C_2H_4$) conventionally contained in the exhaust gases and the size of which could allow them to adsorb into the space between the lamellae in the materials, it can be seen that the adsorption capacity is only reduced by about 30%. Such results suggest that the materials claimed by the Applicant can be used to trap oxides of nitrogen contained in exhaust gases, with high HSVs and gaseous molecules other than $NO_x$.

The desorption temperatures for the oxides of nitrogen trapped in the material are not significantly modified either by increasing the HSV or by the presence of other molecules adsorbed on the material.

TABLE III

Adsorption test results

| Example | Materials | HSV ($h^{-1}$) | Composition of mixture during pre-treatment | Composition of mixture during adsorption | Capacity at 200° C. (mgNO/g) | $T_{des}$ (° C.) |
| --- | --- | --- | --- | --- | --- | --- |
| 1 (inv) | Cs—ZrP + Pt | 5000 | $O_2$, $H_2O$, $N_2$ | NO, $O_2$, $H_2O$, $N_2$ | 1.5 | 360 |
| 1 (inv) | Cs—ZrP + Pt | 50000 | $O_2$, $H_2O$, $N_2$ | NO, $O_2$, $H_2O$, $N_2$ | 1.3 | 345 |
| 1 (inv) | Cs—ZrP + Pt | 50000 | $O_2$, $CO_2$, $H_2O$, $C_2H_4$, $N_2$ | NO, $O_2$, $CO_2$, $H_2O$, $C_2H_4$, $N_2$ | 0.9 | 340 |

Example 15

Evaluation of Poisoning by Sulphur-containing Molecules

The test, materials were installed in a micro-reactor placed in the centre of a furnace. They underwent a pre-treatment at 600° C. for 5 hours in a gas mixture constituted by nitrogen containing 10% $O_2$ and 2% $H_2O$. Under the same mixture, these materials were brought to a temperature of 200° C., where they were traversed for 20 minutes by a gas mixture containing oxides of nitrogen and sulphur dioxide.

| Hourly space velocity (HSV) | 5000 $h^{-1}$ |
| --- | --- |
| Composition of mixture | |
| NOx | 800 ppm |
| $SO_2$ | 50 ppm |
| $O_2$ | 10% |
| $H_2O$ | 2% |
| $N_2$ | complement to 100% |

After twenty minutes of adsorption, the supply of oxides of nitrogen and sulphur was cut off and the materials were heated to desorb the $NO_x$:

| Hourly space velocity (HSV) | 5000 $h^{-1}$ |
| --- | --- |
| Composition of mixture | |
| $O_2$ | 10% |
| $H_2O$ | 2% |
| $N_2$ | complement to 100% |
| Desorption temperature range | 200° C. to 600° C. |
| Temperature change | 10° C./min |

They then underwent a second adsorption and desorption series.

Table IV below indicates, for the materials of Examples 1 and 4, the quantity of oxides of nitrogen adsorbed and the desorption temperatures of these oxides in the presence or absence of sulphur dioxide.

TABLE IV

Sulphur sensitivity evaluation

| | | | 1st adsorption | | 2nd adsorption | |
|---|---|---|---|---|---|---|
| Examples | Materials | HSV (h$^{-1}$) | Capacity at 200° C. (mgNO/g) | T$_{des}$ (° C.) | Capacity at 200° C. (mgNO/g) | T$_{des}$ (° C.) |
| 1 (inv) | Cs—ZrP with Pt | 5000 no SO$_2$ | 1.5 | 360 | 1.5 | 360 |
| 1 (inv) | Cs—ZrP with Pt | 5000 with SO$_2$ | 1.2 | 355 | 1.2 | 355 |
| 11 (inv) | Cs—ZrP, SiO$_2$ bridged | 5000 no SO$_2$ | 18.3 | 320 | 18.3 | 320 |
| 11 (inv) | Cs—ZrP, SiO$_2$ bridged | 5000 with SO$_2$ | 14.6 | 315 | 14.6 | 315 |
| 4 (comp) | Pt—BaLaCe/ Al$_2$O$_3$—TiO$_2$ | 5000 no SO$_2$ | 6.1 | 570 | 5.7 | 570 |
| 4 (comp) | Pt—BaLaCe/ Al$_2$O$_3$—TiO$_2$ | 5000 with SO$_2$ | 4.1 | 560 | 3.0 | 560 |

The adsorption capacity for oxides of nitrogen of the materials of Examples 1 and 11 was only reduced by 20% in the presence of sulphur dioxide, as opposed to 33% for the prior art material of Example 4.

The desorption temperatures of the trapped oxides of nitrogen were substantially equal to the temperatures obtained during the no-sulphur experiments.

However, the materials of Examples 1 and 11 regained all of their initial adsorption capacity after thermal desorption at 600° C. (the capacity during the second adsorption was equal to the capacity of the first adsorption), which was not the case for the compound of Example 4. The NO$_x$ traps claimed by the Applicant thus have the major advantage of being capable of ready regeneration following contact with oxides of sulphur while the materials functioning to trap NO$_x$ by nitrate formation (Example 4) are poisoned by sulphate species which are extremely stable thermally.

What is claimed is:

1. A process for adsorbing and desorbing oxides of nitrogen in exhaust gases, in particular from internal combustion engines of automotive vehicles, in the presence of a material with a lamellar structure and comprising phosphate tetrahedra, at least one element (A) from group IVB, VB, VIB, VIIB, or IVA of the periodic table, at least one element B of an alkali, an alkaline earth, a rare earth or a transition metal and at least one element from Group IIIA or IVA of the periodic table, wherein the at least one element B is located in a space between lamellae of the material with the lamellar structure and is in a cationic state.

2. A process according to claim 1, in which element (A) of said material with a lamellar structure has an oxidation number of +4.

3. A process according to claim 1, wherein said element (A) is zirconium, titanium, germanium or tin.

4. A process according to claim 1, wherein said element (B) is cesium.

5. A process according to claim 1, wherein said material further comprises at least one metal (C) of a noble metal from group VIII of the periodic table.

6. A process according to claim 5, wherein said element (C) is platinum.

7. A process according to claim 1, in which a composition by weight of said material comprises, as a percentage by weight:
   20% to 80% of phosphate, expressed as PO$_4$;
   5% to 40% of at least one element (A);
   optionally, 1% to 55% of at least one element (B);
   optionally, 0.05% to 5% of at least one metal (C).

8. A process according to claim 1, wherein said material comprises pillars in the lamellar structure.

9. A process according to claim 8, wherein said pillars formed in an interlamellar space comprise at least one oxide or a solid solution of at least one oxide of at least one element of group IIIA, group IVA or a transition metal.

10. A process according to claim 8, wherein said material has a specific surface area in the range 30 to 500 m$^2$/g.

11. A process according to claim 1, wherein said material comprises at least one porous support.

12. A process according to claim 11, wherein the porous support is a compound of SiO$_2$, Al$_2$O$_3$, TiO$_2$ZrO$_2$, SiC, MgO or lumino-silicate.

13. A process according to claim 1, wherein said material comprises at least one rigid support.

14. A process according to claim 1, wherein adsorption of the oxides of nitrogen is carried out at a temperature in the range 50° C. to 400° C.

15. A process according to claim 14, wherein desorption of the oxides of nitrogen is carried out at a temperature in the range 300° to 500° C.

16. A process according to claim 14, comprising a step for selective reduction of oxides of nitrogen to molecular nitrogen and/or nitric oxide.

17. A process according to claim 16, in which reduction of the oxides of nitrogen takes place in the presence of a catalyst comprising at least one inorganic refractory oxide, optionally at least one zeolite, at one element of group VIB, group VIIB, group VIII, or transition metal group IB, optionally at least one element from a noble metal of group VIII, and optionally at least one element of an alkaline-earth group IIA, or a rare earth IIB.

18. A process according to claim 1, wherein the engine is a diesel engine.

* * * * *

UNITED STATES PATENT AND TRADEMARK OFFICE
CERTIFICATE OF CORRECTION

PATENT NO. : 6,471,923 B1
DATED : October 29, 2002
INVENTOR(S) : Thierry Becue et al.

It is certified that error appears in the above-identified patent and that said Letters Patent is hereby corrected as shown below:

Column 16,
Line 31, reads "TiO2ZrO2," should read -- TiO2, ZrO2, --
Line 32, reads "lumino-silicate." should read -- alumino-silicate. --
Line 47, reads "at one element" should read -- at least one element --

Signed and Sealed this

Sixteenth Day of September, 2003

JAMES E. ROGAN
*Director of the United States Patent and Trademark Office*